T. A. EDISON,
Assignor of one-half interest to G. B. PRESCOTT.
Quadruplex-Telegraph Repeater.
No. 8,906. Reissued Sept. 23, 1879.
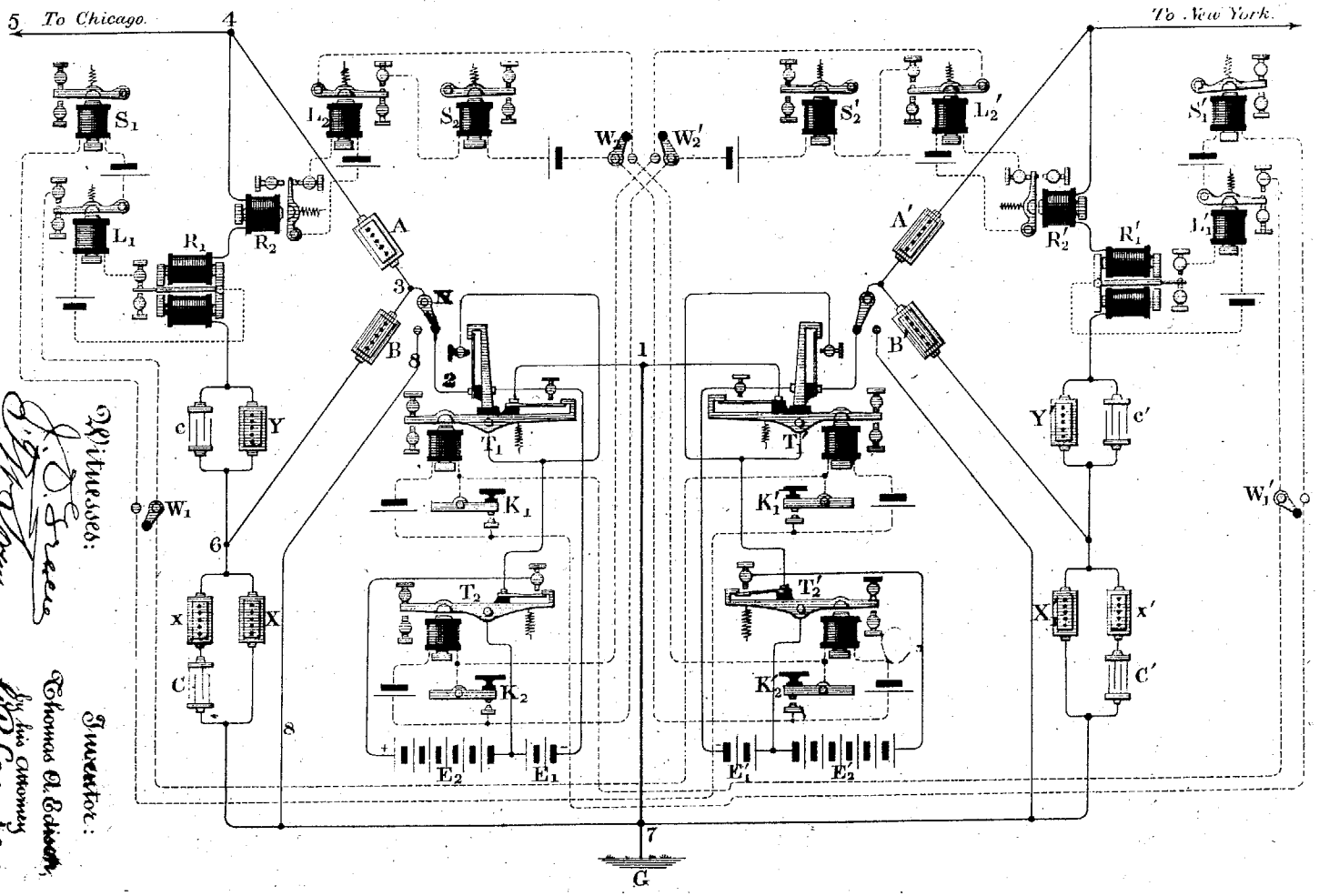
Witnesses:
J. D. Greene
G. W. Pope
Inventor:
Thomas A. Edison,
by his Attorney
G. P. Lowrey

UNITED STATES PATENT OFFICE.

THOMAS A. EDISON, OF MENLO PARK, NEW JERSEY, ASSIGNOR OF ONE-HALF INTEREST TO GEORGE B. PRESCOTT.

IMPROVEMENT IN QUADRUPLEX-TELEGRAPH REPEATERS.

Specification forming part of Letters Patent No. 209,241, dated October 22, 1878; Reissue No. 8,906, dated September 23, 1879; application filed November 16, 1878.

*To all whom it may concern:*

Be it known that I, THOMAS A. EDISON, now of Menlo Park, in the county of Middlesex and State of New Jersey, have invented certain new and useful Improvements in Quadruplex Telegraphs, which improvements are fully set forth in the following specification, reference being had to the accompanying drawings.

My present invention consists in certain improvements upon the apparatus described in my application for Letters Patent filed on or about the 1st day of September, A. D. 1874, for improvement in duplex telegraphs, and designated as Case 99; and has for its object, first, to provide means of compensating the effects of static induction and discharge upon the instruments at the receiving-station when two sets of signals are transmitted simultaneously in the same direction without interfering with the transmission of one or more sets of signals in the opposite direction; second, to provide means whereby the adjustment of the balance at either station, in a system of duplex or quadruplex telegraphy, may be conveniently effected without interference from the transmitting-instruments or batteries at the other station; and, third, to provide means whereby two quadruplex circuits may be coupled together, so that two sets of signals may be repeated from the first circuit into the second at the same time that two other sets of signals are being repeated from the second circuit into the first.

In the accompanying drawings I have shown two complete sets of apparatus arranged for quadruplex transmission, in order to properly illustrate the method of repeating from one set of apparatus to the other. As these two sets of apparatus are exact counterparts of each other, the same letters of reference have been applied to each, those pertaining to the right-hand set being distinguished by a prime mark.

In my hereinbefore-mentioned application designated as Case 99, I have described a duplex telegraph in which two independent sets of signals may be simultaneously transmitted over a telegraphic circuit in the same direction, one instrument at the receiving-station responding solely to changes in the polarity of the current, and the other instrument solely to changes in the strength of the current.

In my present invention the apparatus and method described in Case 99 are combined with the arrangement of circuits and method of simultaneous duplex transmission in opposite directions set forth in Letters Patent of the United States granted to Joseph B. Stearns on the 12th day of November, A. D. 1872, No. 132,932, and reissued on the 22d day of June, 1875, No. 6,508, by means of which combination I am enabled to simultaneously transmit four independent sets of signals over one wire.

When this combined apparatus, technically termed a "quadruplex telegraph," is applied to a submarine cable or a land-line of considerable length, the correct operation of the system is materially interfered with by the phenomena of static induction and discharge which manifest themselves upon the receiving-instruments. The tendency of the return discharge from the outgoing currents is to produce a false signal upon the receiving-instruments at the home station each time that the current is reversed, or the key-connection is changed from the battery to the earth. This effect is neutralized by the application of a rheostat and condenser to the artificial line in the manner fully set forth in Letters Patent of the United States No. 126,847, granted to Joseph B. Stearns on the 14th day of May, A. D. 1872, and reissued as No. 5,344 on the 1st day of April, 1873, to which reference is had.

The effect upon the receiving-instruments, when two sets of signals are being simultaneously received, of the static induction which arises from the incoming currents is entirely different and distinct from that caused by outgoing currents, and requires a different method of compensation. The manner in which I have effected this compensation will be hereinafter set forth.

Referring to the drawings, $T_1$ is a current-reversing or pole-changing transmitter, which is operated, in the usual manner, by a finger-key, $K_1$, and local battery. It is connected with the ground G at the point 1, and with the line at the point 2, and is so arranged that when in a position of rest the positive or zinc pole of the battery $E_1$ is to line and the negative or copper pole to the earth; but when depressed the polarity of the battery with respect to the line and earth is reversed. $T_2$ is a single-current transmitter, which, when depressed, simply connects the battery $E_2$ to the battery $E_1$; and as the former is, say, three times the size or strength of the latter, the effect of depressing the transmitter $T_2$ is simply to increase the strength of the current going to line irrespective of its polarity.

One receiving-instrument, $R_1$, responds solely to changes in the polarity of the current traversing its coils without reference to its strength, while the other instrument, $R_2$, responds solely to changes in the strength of the current without reference to its polarity. The two sounders $S_1$ and $S_2$ are, respectively, operated by the receiving-instruments $R_1$ and $R_2$ through the intervention of the local relays $L_1$ and $L_2$.

The apparatus thus for described is essentially the same in construction and mode of operation as that described in my hereinbefore-mentioned application, No. 99; but in order to convert this into a quadruplex apparatus, it is necessary to combine it with some system of duplex transmission in opposite directions.

I have shown in the drawings the hereinbefore-mentioned method patented by Joseph B. Stearns, in which the outgoing current from the transmitter $T_1$ divides at the point 3 between the main line 3 4 5 and the artificial line 3 6 7. The receiving-instruments $R_1$ and $R_2$ are placed in a bridge-wire, 4 6, which is rendered neutral to outgoing currents in accordance with a well-known law by so adjusting the artificial resistances or rheostats A, B, and X that the proportion of A to B is the same as that of the line to X. The electro-static capacity of the line is balanced by the condenser C, which is attached to the artificial line, and is therefore charged and discharged simultaneously with the main line, the duration of the discharge being regulated by means of the adjustable rheostat $x$. This condenser is not effected by the incoming currents, as the resistence between the point 6 and the earth at 7 is so much greater by the way of the rheostat X than by the way of 3, 2, and 1 that the position of the received current passing by that route is inconsiderable.

The effect of electro-static induction upon the alternate positive and negative signals sent by the transmitter $T_1$ and received by the instrument $R_1$ is to shorten them by increasing the length of the neutral space which separates them, and this effect increases in proportion to the square of the length of the line. The result is, that on a long line there is a tendency in the receiving-instrument $R_1$ to shorten dashes into dots and to obliterate dots altogether. Moreover, if a reversal occurs while a signal is being made upon the receiving-instrument $R_2$ the armature of the latter often falls off for so great a length of time as to make a break in the signal.

I have succeeded in compensating this effect by placing a condenser, $c$, between the main and artificial lines, so that one set of its plates is in connection with a point in the main line, and the opposite set of plates in connection with a point in the artificial line, having the same potential with respect to outgoing currents. When the receiving-instruments are placed in a bridge-wire, as shown in the drawings, the condenser may also be attached to the bridge-wire. It is obvious that in this position it can only be charged and discharged by the action of incoming currents. When, for example, a positive current is traversing the receiving-instruments, the condenser $c$ receives a positive charge, and at the movement of reversal gives it out again in advance of the arrival of the negative current from the distant station. This positive discharge passes through the receiving-instruments $R_1$ and $R_2$ in the reverse direction, and produces the same effect upon them as a negative current, instantaneously succeeding the termination of the positive current, thus compensating the effect of static induction upon the received signals.

The amount of charge in the condenser $c$ is regulated, as required, by means of the rheostat Y, which is inserted in the bridge-wire between the points of connection of the condenser, the charge being always in proportion to the resistance unplugged.

In the system of quadruplex transmission which has been described there is always a current upon the line, either positive or negative, from the battery $E_1$, and this current, when arriving from the distant station, renders it impossible for the operator at the home station to adjust the resistances, or, as it is technically termed, "balance" the instruments. To avoid this difficulty I provide a three-point switch, N, which is placed between the point 3 at the junction of the main and artificial lines and the transmitter $T_1$, so that by turning the switch to connect the point 3 with the wire 8, instead of the wire 2, the line may be connected directly to the earth at G without including the battery $E_1$. This arrangement enables the balancing to be effected without difficulty.

In order to arrange two sets of quadruplex apparatus upon two different lines, so that each set of signals may be repeated over the other line, it is necessary to connect the receiving-instruments of each line to the corresponding transmitters of the other line, which is most conveniently done by means of the local circuits. Thus in the drawings the two sets of quadruplex apparatus are supposed to be placed at Buffalo, the left-hand line going to Chicago and the right-hand line to New York. By tracing the connections (shown in dotted lines) it will be observed that the local circuit of receiving-sounder $S_1$ is continuous with the local circuit of transmitter $T'_1$, and in like man.

ner the local circuit of sounder $S_2$ is continuous with the local circuit of transmitter $T'_2$. In precisely the same manner $S'_1$ and $S'_2$ are connected with $T_1$ and $T_2$.

By closing the switches $W_1$ and $W_2$ the local circuits connecting $S_1$ and $T'_1$ and $S_2$ and $T'_2$ may be divided, permitting each to work independently. The corresponding switches $W'_1$ and $W'_2$ on the opposite side serve a similar purpose. In this manner either one of the four separate sets of signals which are being simultaneously transmitted over one circuit may be automatically repeated into the other circuit or not, at pleasure, by opening or closing the corresponding switch.

I claim as my invention—

1. In a duplex, or quadruplex telegraph, a condenser having one of its inductive surfaces connected with the main line and the other with the artificial line at points of equal potential with reference to outgoing currents, so as to receive a charge from incoming but not from outgoing currents, substantially as and for the purpose specified.

2. In a duplex or quadruplex telegraph, the combination of a main line, an artificial line, and a bridge-wire connecting the said lines at points of equal potential with reference to outgoing currents, with a rheostat or artificial resistance placed in said bridge-wire, and a condenser, the opposite inductive surfaces of which are connected with the said bridge-wire upon opposite sides of said rheostat, substantially as and for the purpose specified.

3. In a quadruplex telegraph, the combination at one station of two receiving-instruments, one operated by changes in the polarity of the current irrespective of its strength, and the other operated by changes in the strength of the current irrespective of its polarity, with two condensers, one of which receives a charge from outgoing but not from incoming currents, while the other receives a charge from incoming but not from outgoing currents, substantially as and for the purpose specified.

4. In a duplex or quadruplex telegraph, a switch or commutator placed between the transmitting apparatus and the point of junction of the main and artificial lines at the same station, and so arranged that the latter point may be disconnected from the transmitting apparatus and connected directly to the earth, substantially as and for the purpose specified.

5. In combination with two main-line circuits, each capable of quadruplex operation, the repeating-magnets, local circuits, switches, and connections, arranged substantially as set forth, so that any one set of signals may be repeated independently of any other set, substantially as set forth.

6. The combination, with the receiving-sounders in one line, of repeating-instruments, local circuits and switches, and transmitting-instruments in the other line, arranged and operating substantially as and for the purposes set forth.

THOMAS A. EDISON.

Witnesses:
STOCKTON L. GRIFFIN,
MARTIN N. FORCE.